(12) United States Patent
Karlsson

(10) Patent No.: US 10,318,961 B2
(45) Date of Patent: Jun. 11, 2019

(54) METHOD AND ARRANGEMENT FOR PROVIDING NETWORK EVENTS

(75) Inventor: Marcus Karlsson, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1687 days.

(21) Appl. No.: 13/978,078

(22) PCT Filed: Jan. 12, 2011

(86) PCT No.: PCT/SE2011/050024
§ 371 (c)(1),
(2), (4) Date: Jul. 2, 2013

(87) PCT Pub. No.: WO2012/096598
PCT Pub. Date: Jul. 19, 2012

(65) Prior Publication Data
US 2013/0290194 A1    Oct. 31, 2013

(51) Int. Cl.
*G06Q 30/00* (2012.01)
*H04L 12/24* (2006.01)
*H04M 3/42* (2006.01)
*H04M 3/51* (2006.01)
*G06Q 30/02* (2012.01)

(52) U.S. Cl.
CPC ......... *G06Q 30/016* (2013.01); *H04L 41/069* (2013.01); *H04L 41/5061* (2013.01); *H04M 3/42068* (2013.01); *H04M 3/51* (2013.01); *H04M 2203/408* (2013.01); *H04M 2203/551* (2013.01)

(58) Field of Classification Search
CPC combination set(s) only.
See application file for complete search history.

(56) References Cited

U.S. PATENT DOCUMENTS 6,564,227 B2    5/2003    Sakakibara et al.
6,859,783 B2 *  2/2005    Cogger ............... G06F 11/0709
                                                 235/381
(Continued)

FOREIGN PATENT DOCUMENTS

EP    1113365    7/2001

OTHER PUBLICATIONS

International Search Report for PCT/SE2011/050024 dated Oct. 20, 2011.
Office action in application No. 11855731.3 dated Jul. 21, 2015.

*Primary Examiner* — Mark A Fleischer
(74) *Attorney, Agent, or Firm* — Patent Portfolio Builders, PLLC

(57) ABSTRACT

System, arrangement and method for providing information regarding network events associated with a subscriber in an access network. A customer care session is initiated between a customer care unit and a data warehouse. The session is referring to an identity of said subscriber. A subscription to network events associated with the subscriber is done, where the data warehouse subscribes to a stream of ongoing network events. The content of the stream refers to the identity of the subscriber. Information is received regarding ongoing network events which are triggered by one or more communications between a terminal of the subscriber and a network element in the network. The information is provided to a customer care agent.

25 Claims, 8 Drawing Sheets

(56) References Cited

U.S. PATENT DOCUMENTS

| | | |
|---|---|---|
| 7,035,619 B1 | 4/2006 | Fargano et al. |
| 8,073,777 B2 * | 12/2011 | Barry ................ G06F 11/0709 |
| | | 370/389 |
| 2001/0018691 A1 | 8/2001 | Sakakibara et al. |
| 2001/0041566 A1 | 11/2001 | Xanthos et al. |
| 2003/0229884 A1 * | 12/2003 | Carr ................ G06F 17/30306 |
| | | 717/101 |
| 2007/0189272 A1 | 8/2007 | Hutchinson et al. |
| 2009/0124271 A1 * | 5/2009 | Roundtree ........ H04M 1/72552 |
| | | 455/466 |

* cited by examiner

METHOD AND ARRANGEMENT FOR PROVIDING NETWORK EVENTS

This application is the U.S. national phase of International Application No. PCT/SE2011/050024 filed 12 Jan. 2011 which designated the U.S., the entire contents of which is hereby incorporated by reference.

TECHNICAL FIELD

The invention relates generally to a method and arrangement for providing information on network events.

BACKGROUND

Decreasing the rate of subscribing customers who are leaving for another mobile operator, i.e. churn rate, is currently an objective for most mobile operators in competitive markets with high mobile subscription penetration. In most markets, so called "loss leader" introductory offers are common in order to stimulate new subscribers to switch from their current mobile operator to a new mobile operator. Loss leader offers are often priced as cheap as possible and thus often contributes a loss with each sale. Consequently, replacing lost subscribers can negatively affect profitability of the mobile operator since loss leader offers may be needed. It is therefore of great interest to ensure the satisfaction of subscribers in a mobile network.

One significant component in increasing the subscriber satisfaction may be a dynamic and capable customer care function. A satisfied subscriber is less prone to switch mobile operator. The customer care is the primary interface towards the subscriber when problems arise. Thus, the capability of the customer care may be of importance in keeping the subscriber satisfied which in the prolongation may lead to a decreased churn rate.

The likelihood of solving a subscribing customer's issue at the customer care function strongly depends on the available information which is associated with the subscriber, i.e. it is important that the customer care function can access recent, accurate and relevant call and account history. In fact, the vast majority of issues handled by customer care are related to the most recent events.

With reference to FIG. 1, which is block chart showing a network architecture according to the prior art, account and call history in relation to customer care will now be described.

Terminals 101,102,103 are present in cells associated with radio base stations 100a, 100b in the access network 105. The radio base stations 100a, 100b are connected to a radio base station controller 111 which is arranged in connection with the core network 113. Network events, taking place in the access network 105, the core network 113 or in the Business Support System (BSS) 120 e.g. in the billing and rating system 124, are provided to a data warehouse 121. The network events may be represented by Call Data Records (CDR). Typically, CDRs for multiple customers are stored in a file in an interim position within the core network 113. The file, containing the CDRs, is then typically sent to the data warehouse 121 at certain intervals.

When an agent 124 of a customer care unit 123 wants to fetch the account and call history, the customer care unit 123 requests, from the data warehouse 121, a list of the most recent network events associated with the subscriber. The customer care unit 123 will then receive a data set comprising the network event data for said subscriber, available at that moment in the data warehouse.

Using the customer care unit 123 as described above, the customer care unit agent 124 will have to actively fetch the network event data from the data warehouse 121 to acquire the most recent network events. Therefore, the customer care unit agent 124 only has a snapshot of the network event history which may be insufficient to solve the customer's 125 issue which may need evaluation of events over a longer period as well as ongoing events.

The only way for the customer care unit agent to ensure that the most recent events are presented is to continuously poll the system. Having one or more customer care agents continuously polling the customer care unit and the data warehouse in parallel will lead to a high, in some cases critical, system load. Even more importantly, using the prior art system of FIG. 1 may not enable the customer care unit agent to acquire sufficient information in order to solve the customer's issue.

SUMMARY

It is an object of the invention to address at least some of the limitations, problems and issues outlined above. It is also an object to improve the process of providing information regarding network events in an access network to a customer care unit. It may be possible to achieve these objects and others by using a method and an arrangement as defined in the attached independent claims.

According to one aspect, a method is provided in a customer care unit for providing information regarding network events associated with a subscriber in an access network. A customer care session may be initiated between a customer care unit and a data warehouse. The session can refer to an identity of the subscriber. A subscription to network events associated with the subscriber can be done, where the data warehouse may subscribe to a stream of ongoing network events. The content of the stream normally refers to the identity of the subscriber. Information is received from the data warehouse, where the information regards ongoing network events which are triggered by one or more communications between a terminal of the subscriber and a network element in the network. The information is provided to a customer care agent from the customer care unit.

According to another aspect, a method is provided in a data warehouse for providing information regarding network events associated with a subscriber in an access network. The data warehouse may receive a subscription request referring to the subscriber from a customer care unit. The data warehouse may subscribe to a stream of ongoing network events. The content of the stream may refer to the identity of the subscriber. The data warehouse recognizes an ongoing network event associated with the subscription. The network event may be triggered by one or more communications between a terminal of the subscriber and a network element in the network. The data warehouse may then provide an update comprising information about the recognized network event to the customer care unit.

According to another aspect, an arrangement in a data warehouse is provided. The data warehouse may be adapted to provide information regarding network events which may be associated with a subscriber in an access network. The data warehouse may comprise an initiation unit which may be adapted to initiate a customer care session with a customer care unit. The session may refer an identity of the subscriber. The data warehouse may further comprise a subscription unit which may be adapted to subscribe the customer care unit to a stream of is ongoing network events.

The network events may be associated with the identity of the subscriber. The data warehouse may further comprise a recognizing unit which may be adapted to recognize ongoing network events which are associated with the identity of the subscriber. The data warehouse may also comprise a providing unit which may be adapted to provide information regarding the network events to the customer care unit, where the providing unit may further be adapted to provide updated information to the customer care unit. The updated information may be based on the network events recognized by the updating unit and the subscription provided by the subscription unit.

According to another aspect, a system for providing information regarding network events is provided, where the network events are associated with a subscriber in an access network. The system comprises a data warehouse which is adapted to receive and store information referring to network events. The system further comprises one or more network elements which are adapted to send information referring to one or more network events to the data warehouse. The network events are triggered by one or more communications between a terminal of the subscriber and the network element. A customer care unit is comprised in the system. The customer care unit is adapted to initiate a customer care session with the data warehouse referring to an identity of the subscriber, wherein the customer care unit is further adapted to request, from the data warehouse, a subscription to network events associated with the subscriber. The data warehouse is further adapted to subscribe to a stream of ongoing network events based on the request from the customer care unit. The content of the stream refers to the identity of the subscriber. The data warehouse is further adapted to provide updated information to the customer care unit, based on the stream of ongoing network events.

By using the methods, systems and/or arrangement presented above, a customer care agent may serve a customer in a more satisfying manner. The customer care agent may continuously have access to the most recent information regarding the customer.

The above methods, system and arrangements may be configured and implemented according to different embodiments. In one example embodiment, the requesting of a subscription, from the customer care unit to the data warehouse, further comprises to fetch a network event history comprising the most recent network events.

According to another example embodiment, the customer care unit may provide a request of unsubscribing to the stream of network events to the data warehouse. The request may be provided if the customer care session is deactivated.

According to another possible embodiment, the customer care unit may provide the request of unsubscribing if a customer terminates a call with the customer care agent or if the session has been inactive for a predetermined time period.

According to another example embodiment, where the identity may comprise of at least one of: a Subscription-Id-Type Attribute Value Pair (AVP), Mobile Subscriber Integrated Services Digital Network (MSISDN), International Mobile Subscriber Identity (IMSI), Network Access Identifier (NAI) or a Session Initiation Protocol (SIP) Uniform Resource Identifier (URI). According to another example embodiment the identity may be an internet user account.

According to another possible embodiment, a diameter based protocol may be used to form the communication between the customer care unit and the data warehouse and/or between the network elements and the data warehouse.

According to one example embodiment, the network element may provide the network event to the data warehouse using a Call Data Record (CDR) and/or a diameter based protocol.

According to another possible embodiment, the customer care unit may determine and indicate to the customer care unit whether or not the received network event is related to any one of the network events of the network event history.

Further possible features and benefits of this solution will become apparent from the detailed description below.

DETAILED DESCRIPTION

Figure 1:
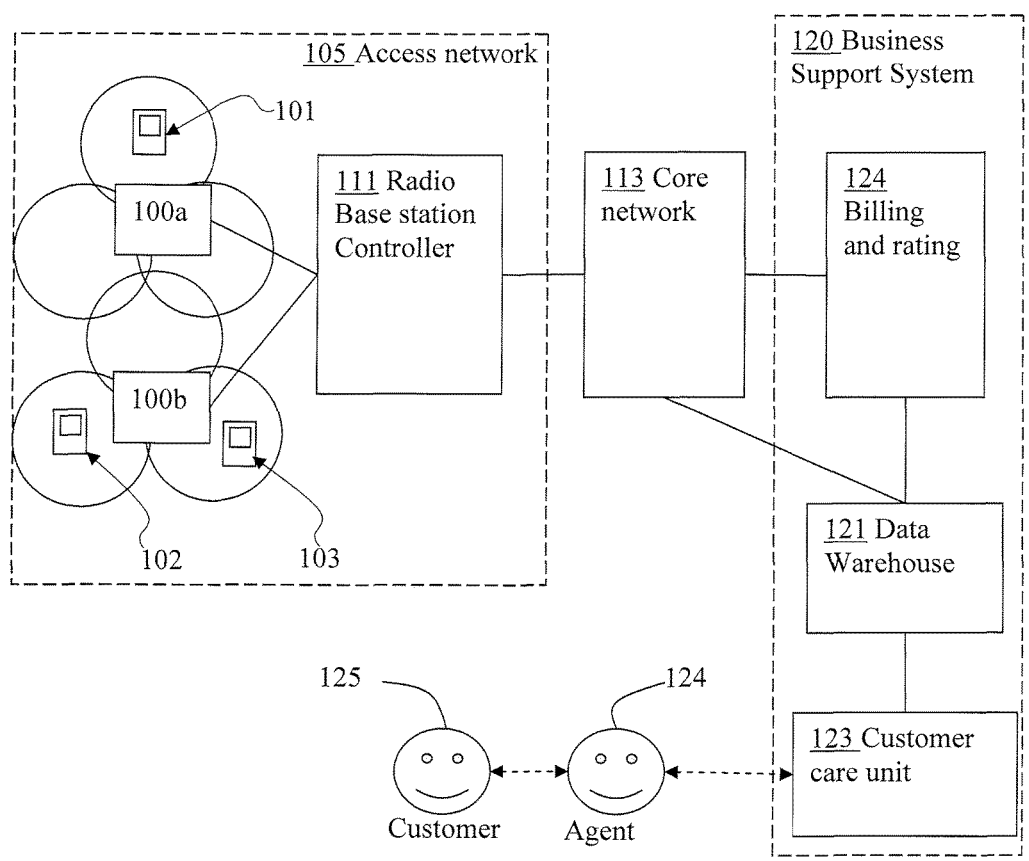
FIG. 1 is a block diagram illustrating a first exemplifying network architecture comprising terminals, access network, core network and a customer care system, according to the prior art.

Briefly described, a solution is provided for providing information on the most recent network events associated with a subscriber in an access network to an entity in a customer management system. The solution may be used to enable customer care agents to enhance the level of customer care service towards a customer and thereby decrease the risk and/or rate of the customer changing operator, i.e. to churn.

In this description, the term "network events" is used to indicate that a terminal, which is associated with a subscriber, performs an action of some sort. A network event may be any type of communication between the terminal and the communication network which is managed by the mobile operator. Network events may be caused by the user interaction with the terminal. However, with more advanced terminals and with the stable and high capacity networks of today, terminals tend to be always online and always connected. Thus, the terminal is constantly causing network events with services running at the terminal.

In the core network, network events may relate to the consumption of voice session time, data volume transferred in a data transfer session. In the above mentioned examples, the information can be provided to a revenue management system in real time using credit control or after the event using CDRs.

Network events may also be created in service networks. Then, the network event typically relates to the usage of a service. One certain example could be the number of sent messages; the time used watching Internet Protocol-TV (IPTV) or the number of downloaded media titles.

Another instance in a network, which may produce network events is the revenue management system. The revenue management system may produce network events when a subscriber's account is changed or manipulated. The revenue management system may also produce network events regarding the cost of a usage of a service, voice session or data session. According to another example, events related to the lifecycle of subscriptions may also produce network events. Examples of lifecycle events may be re-activation or inactivation of a subscription.

The term "network events" should not be limited by the above mentioned examples. Generally network events may comprise any information which concerns a subscriber in a communication network. In order to associate the network events with one or more subscribers, an identity of the subscriber is needed. The identity may be contextual depending on the issue of the customer and the service used by the subscriber. Therefore, in this description, the term "identities" is used to indicate one or more identities of a subscriber. The identity may be valid in the network which is managed by the operator. In such case, the identity is normally a public identity which is defined in one or more of the standards in the art. Below follows a non-limiting list of some examples of identities which may be used to associate network events to a subscriber.

One example of an identifier may be a Subscription-Id-Type Attribute Value Pair (AVP) which is a diameter based identifier. Another example of an identifier type in an access network may be an identifier of the International E.164 format, such as the Mobile Subscriber Integrated Services Digital Network (MSISDN) format. Another type of identifier which may be used in mobile access network is the International Mobile Subscriber Identity (IMSI). Yet another possible identifier may be a Network Access Identifier (NAI). In some applications, Session Initiation Protocol (SIP) Uniform Resource Identifier (URI) may be used in order to identify a subscriber.

Due to the convergence of services, also identities from the private domain may be used in relation to certain services. Such services may generally relate to accounts which are managed and/or used by the subscriber. Certain examples of such services are Twitter, Facebook, Google or Yahoo. In a prolongation of new emerging services, the identity may, in fact, be any account which is related in any way to the customer management system.

Figure 2:
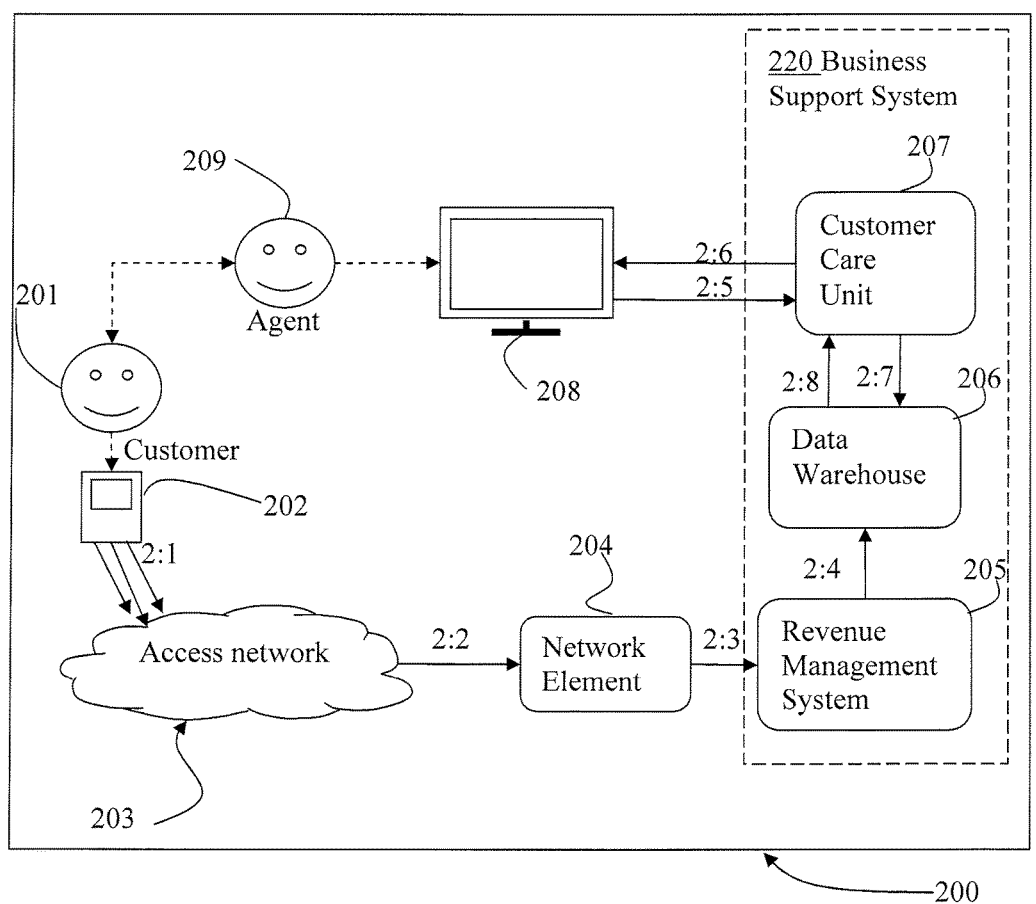
FIG. 2 is a block diagram illustrating an exemplifying flow of events and information in a system layout, according to an exemplifying embodiment.

A system comprising arrangements for providing information on network events to a customer management entity will now be disclosed with reference to FIG. 2. A customer 201 contacts an agent 209 with an issue associated with any one of the customer's terminals. This may for example be done by calling the customer support, via electronic customer support or by visiting a physical customer support site.

A flow of events will now be described with reference to FIG. 2. In a first action 2:1, the terminal 202 may connect to an access network 203. The access network enables communication between the terminal 201 and at least one network element 204 in action 2:2. The network element 204 may typically be arranged in the access network, the core network or in a service network.

Thus, the terminal communicates with network elements via the access network, which in turn creates one or more network events which are registered to a Business Support System (BSS) 220 in action 2:3. The network events may normally be provided in action 2:3 to a revenue management system 205. However, modifications are possible such that information on network events are provided to other entities in the BSS or in a Operations Support System (OSS) 220. According to an example embodiment, the information on the network events may be created for accounting and credit control purposes.

In action 2:4, information on real-time or past are network events provided to the data warehouse 206. This may be done by using CDRs or by real time updates using for instance diameter based protocols which will be further described below. It should be understood that the data warehouse 206 may comprise and receive information regarding network events from one or more network elements.

A data warehouse may be a database used for reporting to various functions of the OSS. Data is may be provided from the network elements to the OSS for purposes of reporting. The data may pass through an operational data store for additional operations before it is used in the data warehouse for reporting.

In order to determine the cause of the customer's 201 issue, the agent 209 may use a customer care client 208 which is arranged to access the customer care unit 207. The agent 209 may provide an identity of the subscriber to the customer care unit 207 in order to retrieve information on past network events and/or subscribe to ongoing and future network events associated with the subscriber in action 2:5. The customer care unit 207 is then adapted to provide a network event history and/or provide information regarding ongoing network events in real time to the agent 209 via the customer care client 208 in action 2:6. Information on the network events and the subscription to ongoing network events may be requested in action 2:7. In response to the request in action 2:7, the data warehouse 206 may provide a network event history and/or to provide information regarding ongoing network events in action 2:8. Information regarding the ongoing network events can be provided according to the previously described flow of actions 2:1-2:4.

The agent 209 is thus enabled to continuously receive updates regarding the most recent network events associated with the terminal 202. Thus, the agent 209, may during the session with the customer 201, monitor and resolve issues related to network events without polling or manually updating the customer care client 208 and the customer care unit 207. Moreover, the agent 209 may be enabled to give immediate response and feedback to the customer when the terminal is creating network events.

The above procedure can be modified in different ways without departing from the invention. For example, one or several actions may be performed in a different order. According to another possible example, the terminal may be a terminal in a fixed network, such as an optical fiber network.

Figure 3:
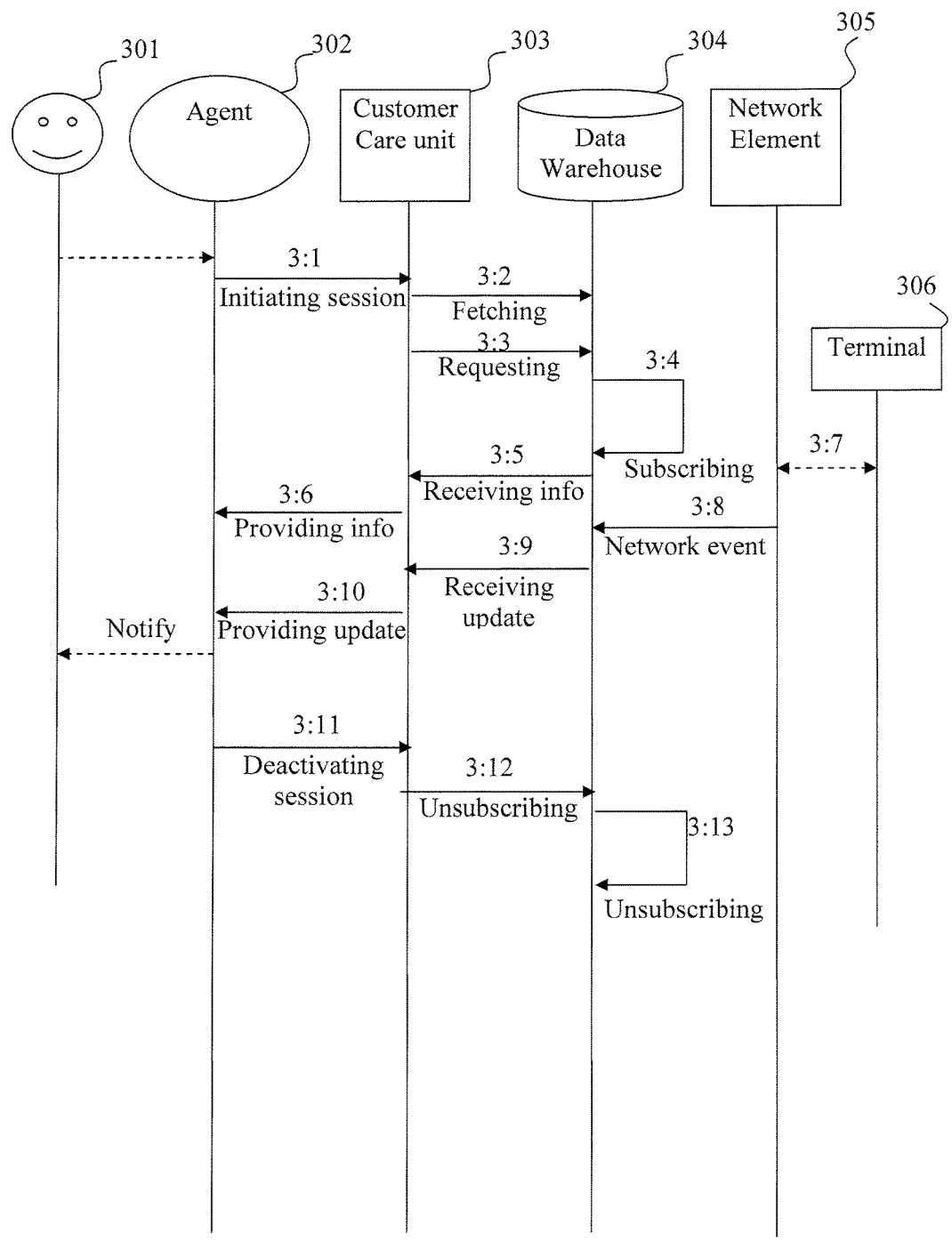
FIG. 3 is a signaling diagram illustrating communication between an agent, a customer care unit, a data warehouse and a network element, according to an possible embodiment.

Features of this solution will now be described with reference to FIG. 3 illustrating an example of a signaling diagram for providing the most recent network events to an customer care agent 302. The agent 302 initiates a customer care session in action 3:1. This typically involves to provide an identity of the subscriber to the customer care unit 303. The customer care unit 303 will then in subsequent actions relate network events to the identity. The customer care unit 303 fetches, from a data warehouse 304, a network event history in action 3:2. The network history may be adapted such that only the most recent events are provided to the customer care unit. The customer care unit 303 requests to subscribe to information on future network events at the data warehouse in action 3:3. The request of action 3:3 refers to the identity of the subscriber.

The data warehouse 304 subscribes the customer care unit 303 to information on network events which are associated with identified subscriber in action 3:4. Thus, if information on a new network event, which is associated with the subscriber, is provided to the data warehouse it may be the basis for an update to the customer care unit 303 which will be further discussed below.

The data warehouse 304 provides the information requested, i.e. the network event history, in action 3:2 to the customer care unit 303 in action 3:5. The customer care unit 303 may then provide the network history to the agent 302 in an action 3:6. One or more semantic filters may be used at the customer care unit in order to only provide the most relevant network events to the agent 302.

If the terminal 306, which is associated with the customer 301, communicates with a network element 305, typically through the access network, in action 3:7, a new network event may be created. The network event is then reported and information on the network event may be provided to the data warehouse in action 3:8. The data warehouse recognizes that the network event refers to the subscriber which may trigger an update procedure at the data warehouse 304. In action 3:9, the data warehouse 304 provides an update notice, comprising information regarding the network event, to the customer care unit 303.

In response to action 3:9, the customer care unit 303 may form an update notice to the agent 302 indicating the network event in action 3:10. According to one possible embodiment, the network event history is updated with the network event. In such embodiment, the network event may be indicated to be related to one or more of the network events of the network event history.

The agent 302 has access to the most relevant and the latest network events which are associated with the customer's 301 identity and thus also the terminal 306. When the customer care session is no longer needed the agent typically deactivates the customer care session in action 3:11. This may of course be done in an automatic manner or by one or several conditional triggers and/or timers. The customer care unit 303 may request to unsubscribe to the stream of information on ongoing network events in action 3:12. The request may for instance refer to the identity of the subscriber. Other ways to keep register of the ongoing subscriptions are also possible. The data warehouse 304 unsubscribes the customer care unit to the ongoing and future network events which are associated with the terminal 306. Thus, the data warehouse will now cease to provide updates regarding network events which are provided and reported as a result from communication between the network element 305 and the terminal 306.

The above procedure can be modified in different ways without departing from the invention. For example, two or more actions may be performed in a different order or in one combined action. For instance, the action 3:3 of requesting for subscribing may be done prior to that a request of fetching the network event history is issued in action 3:2.

The solution may be implemented according to several different design principles. According to one possible example, the procedures, modules and arrangements in this description may be implemented using a Service Oriented Architecture (SOA).

To enable SOA in the arrangements of FIGS. 2-3, an interoperable communication protocol is needed. The protocol may define the different functions and services of the procedures described in this description. The protocol may further to specify how passing and parsing of messages are done. Using such system design, having intersystem interoperability, enables the communication network operator to have several independent hardware and software platforms. This enables so-called loose coupling of the entities of the system where the data warehouse, the customer care unit and the network element are less dependent of the local implementation of each other.

One possible communication protocol type which may be used is a diameter based protocol. A diameter base protocol session comprises exchange of commands and AVPs. Some of the command values are used by the protocol itself while others may deliver data which is associated with different applications and services, such as the solution described in this description.

Diameter protocol sessions normally consist of exchanging commands and AVPs between an authorized client and a server. In this solution, the customer care unit may serve as a diameter client while the data warehouse may serve as a diameter server. The diameter base protocol typically provides the minimum requirements needed for an Authentication, Authorization and Accounting (AAA) protocol, Mobile IPv4, or remote network access applications.

Figure 4:
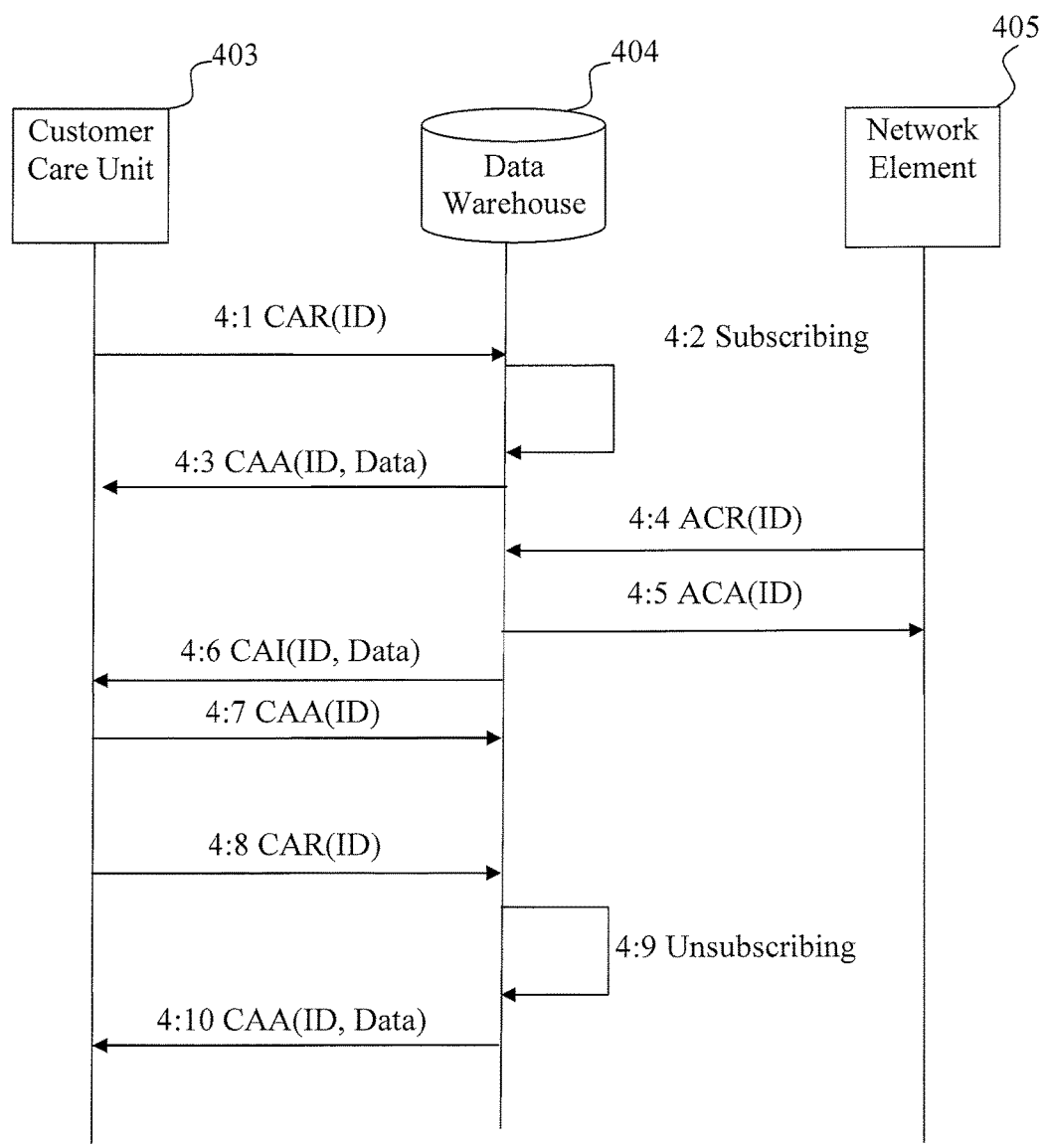
FIG. 4 is a signaling diagram illustrating an certain exemplifying embodiment using diameter commands for communication between a customer care unit, a data warehouse and a network element.

Therefore, a certain optional embodiment of the solution using diameter protocol is possible. With reference to FIG. 4, a signaling diagram using diameter based commands between a customer care unit 403, a data warehouse 404 and a network element 405, will now be described according to an example embodiment. It should be noted that this is merely an example. Other protocols and system designs may be used in enabling communication between the customer care unit, data warehouse and/or the network element.

In a first action 4:1 The customer care unit issues a Call & Account Request (CAR) which comprises an identity (ID) of a subscriber. In this action, the CAR defines a request to fetch and subscribe the customer care unit to network events which are associated with the identity.

The data warehouse 404 is then subscribing, based on the identity provided in action 4:1, the customer care unit to network events referring the subscriber in action 4:2. As a response to the request of action 4:1, the data warehouse issues a diameter command Call & Account Answer (CAA) comprising the ID and data in action 4:3. The data provided in action 3:4 may be the requested data, e.g. network event history or a representation thereof. A CAA is normally a corresponding answer to a CAR, according to the structure of the diameter protocol. Consequently, CAR and CAA may have the same command code according to a structure for indicating request-response messaging.

When the terminal, which is disclosed in FIG. 3, is communicating with the network element 405 causing a network event, the network element 405 sends a Account Request (ACR) indicating the ID is sent to the data warehouse 404 in action 4:4. The data warehouse 404 responds by issuing an Account-Answer (ACA) to the network element.

The data warehouse 404 recognizes the new network event which is provided in action 4:4 and which is referring to the identity provided in action 4:1. Thus, the data warehouse 404 issues a Call & Account Information (CAI) command to the customer care unit 403 in action 4:6, comprising the identity of the subscriber and data. The data may be related to the network event and/or a representation thereof. The customer care unit 403 acknowledges the CAI of action 4:6 by issuing a CAA in action 4:7. Also CAI and CAA may have the same command code in conjunction with the structure for indicating request-response, or message and acknowledgement.

When the customer care session is finished, a CAR is issued to the data warehouse in action 4:8. The CAR of action 4:8 indicates request for unsubscription and referring to the ID. In action 4:9, as a response to receiving the request for unsubscription, the data warehouse disrupts to send CAI commands comprising data regarding network events related to the subscriber. The data warehouse sends a CAA in action 4:10 indicating that the subscription to network events referring to the ID has ended.

According to one possible embodiment, the embodiment of FIG. 4 may be implemented with a diameter protocol according to the specification of Request For Comment (RFC) 3588.

Figure 5A:
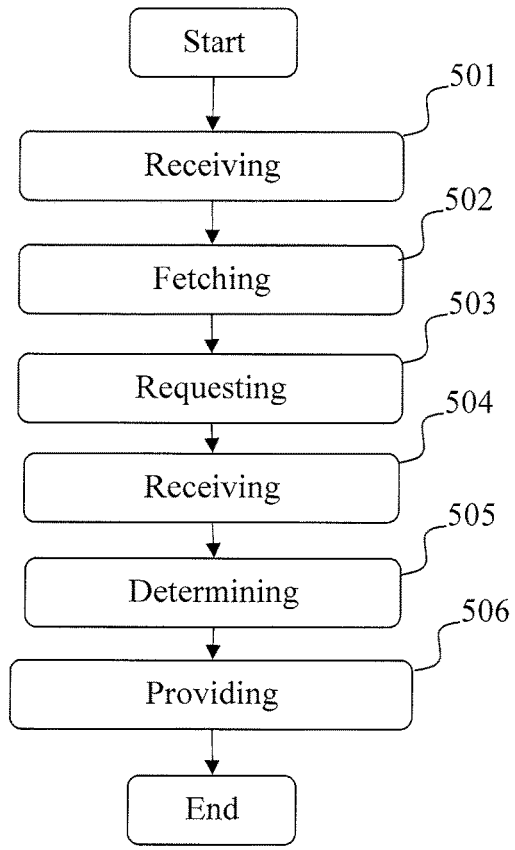
FIG. 5a is a flow chart illustrating a procedure in a customer care unit, according to a possible example embodiment.

With reference to FIG. 5a, a procedure for providing information regarding network events in an access network to a customer care unit will be disclosed, according to one example embodiment.

In a first action 501, the customer care unit initiates a customer care session with a data warehouse. The session is referring to an identity of a subscriber. The customer care unit then requests a history which comprises network events associated with the subscriber in an optional action 502. In action 503, the customer care unit then requests to subscribe to network events which are associated with the subscriber at a data warehouse. The customer care unit thus causes the data warehouse to subscribe to a stream of ongoing network events. The content of the stream refers to the identity of the subscriber.

If a terminal of the subscriber communicates with a network element, a network event is created, provided and reported to the data warehouse. The customer care unit then receives, in action 504, the information regarding the ongoing network event from the data warehouse. The updated information regarding the ongoing network event is provided to a customer care agent in action 505. The above described procedure may enable the customer care agent to provide service based on the most recent information regarding the network events.

Figure 5B:
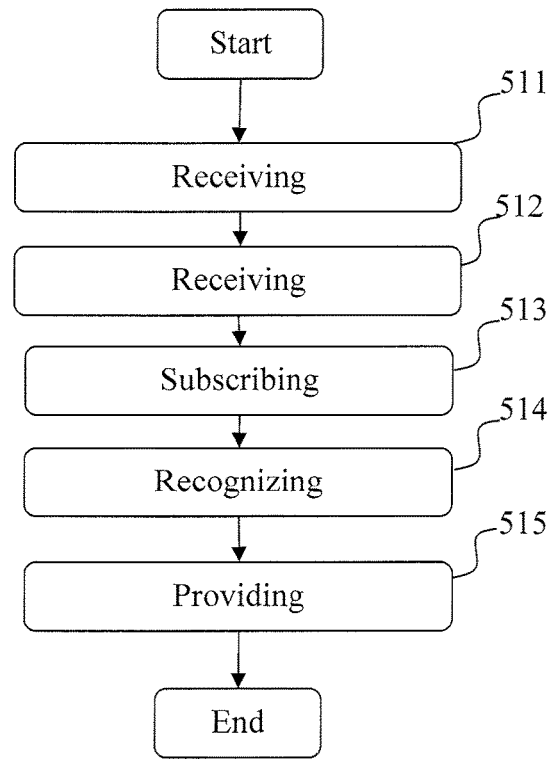
FIG. 5b is a flow chart illustrating a procedure in data warehouse, according to a possible example embodiment.

With reference to FIG. 5b, a procedure for providing information regarding network events from a data warehouse to a customer care unit, according to an example embodiment, will now be described. The procedure of 5b is a corresponding procedure to the procedure in FIG. 5a.

In a first and optional action 511, the data warehouse receives a request, e.g. from a customer care unit, for fetching network event history referring to an identity of a subscriber. The data warehouse further receives a subscription request in action 512 from the customer care unit. The request comprises an identity referring to the subscriber. In action 513, the data warehouse subscribes the customer care unit to a stream of ongoing network events. Consequently, the content of the stream also refers to the identity of the subscriber. The data center then recognizes new network events to be associated with a subscriber with an active subscription. Therefore, new network events which are triggered by one or more communications between a terminal associated with the subscriber and the network element is recognized to be provided as an update to the appropriate customer care unit in action 514. The data warehouse provides, in action 515, an update comprising information about the recognized network event to the customer care unit.

The procedures disclosed with reference to FIG. 5a-b may be performed in the arrangement and system of FIG. 2 or by implementing the actions of the signaling diagrams of FIG. 3 and FIG. 4. The above two procedures of FIGS. 5a-b can be modified in different ways without departing from the invention. For example, one or several actions may be performed in a different order, or in a combined action, but still reach the same technical effect.

Figure 6:
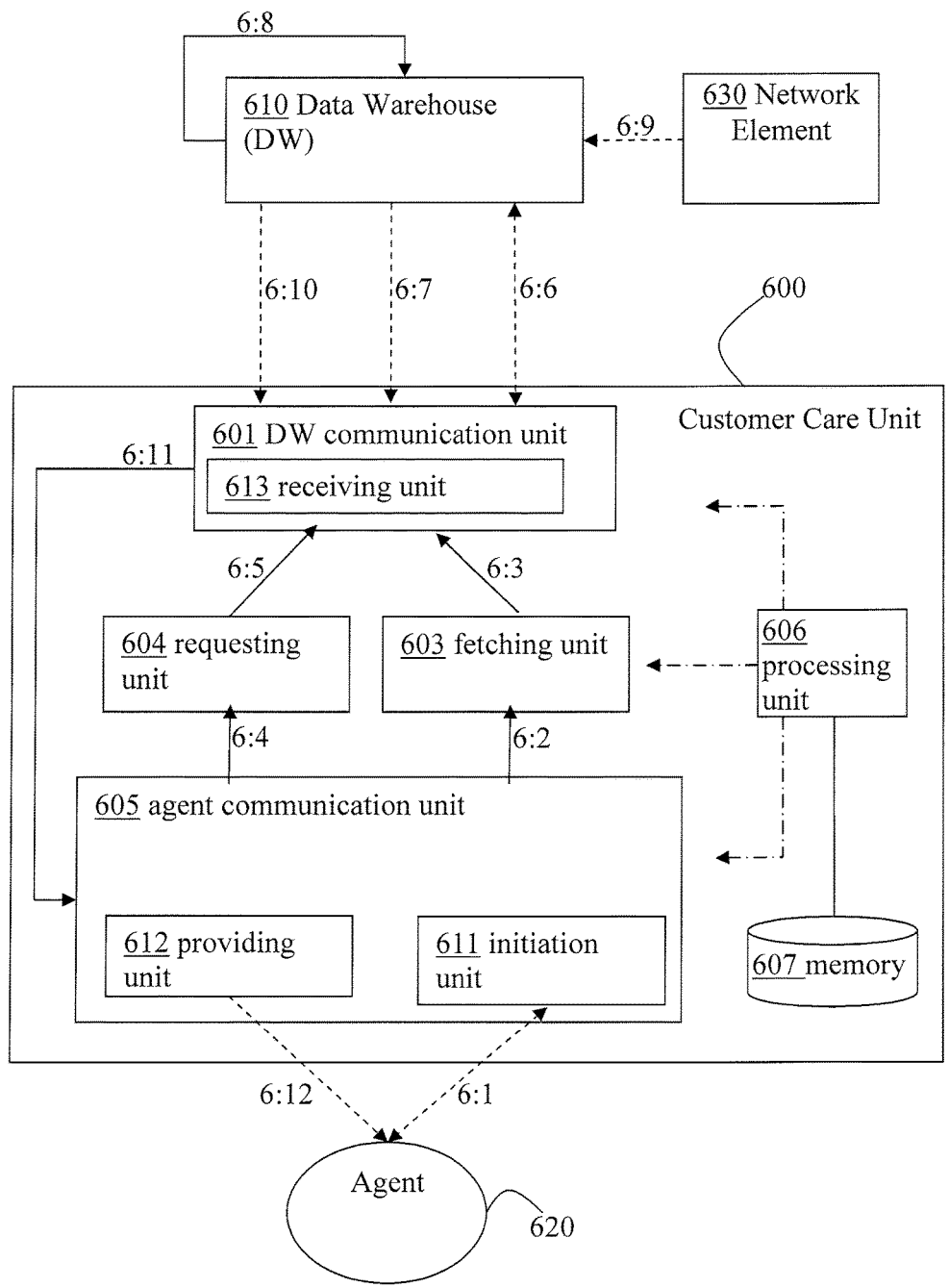
FIG. 6 is a block diagram illustrating an arrangement of a customer care unit, according to an exemplifying embodiment.

With reference to FIG. 6, a customer care unit 600 adapted to perform the related actions of FIG. 2-5b, will now be described. The customer care unit 600 is adapted to provide information regarding network events which are associated with a subscriber in an access network. The customer care unit comprises an initiation unit 611 which is adapted to initiate a customer care session with a customer care agent 620 in action 6:1. The initiation unit 611 may further be adapted to base the session on the identity of the subscriber. The initiation unit 611 is arranged in an agent communication unit 605 which is adapted to manage the communications with one or more agents. The agent communication unit 605 provides the identity to a fetching unit in action 6:2. The fetching unit is adapted to fetch information on one or more network event from the data warehouse via a data warehouse communication unit 601. Thus, the fetching unit 603 instructs the data warehouse communication unit 601 to issue a fetching request to the data warehouse in action 6:3.

The agent communication unit 605 may further be adapted to provide the identity to a requesting unit 604, in action 6:4. The requesting unit 604 may then be adapted to instruct, in action 6:5, the data warehouse communication unit 601 to send a subscription request to the data warehouse in action 6:6. The requesting unit 604 may optionally also be adapted to instruct the data warehouse communication unit 601 to send a request to fetch the network event history from the data warehouse.

The data warehouse 610 may then be provided with the request comprising the identity of the subscriber. Thus, the data warehouse 610 may be enabled to send the requested network event history to the customer care unit, which is illustrated with the optional action 6:7. The data warehouse 610 is further enabled to setup the subscription of incoming network events which is illustrated with action 6:8. If a terminal associated with the subscriber causes a network event by one or more communications with the network element 630, a new network event is created and provided to the data warehouse in action 6:9.

The data warehouse communication unit 601 may comprise a receiving unit 613 which is adapted to receive the new an update regarding the network event from the data warehouse in action 6:10. The receiving unit 613 may be adapted to provide information regarding the network event to the agent communication unit 605 in action 6:11. The agent communication unit 605 comprises a providing unit 612 which is adapted to provide the information from action 6:11 to the agent, using the customer care session, in action 6:12.

The customer care unit 600 may further comprise a processing unit 606 and a memory 607. The processing unit 606 may be adapted to pass and process instructions between the units comprised the customer care unit 600. According to a possible embodiment of the customer care unit 600, the data warehouse communication unit 601 may be adapted to use a diameter protocol to form the communication with the data warehouse 610.

Figure 7:
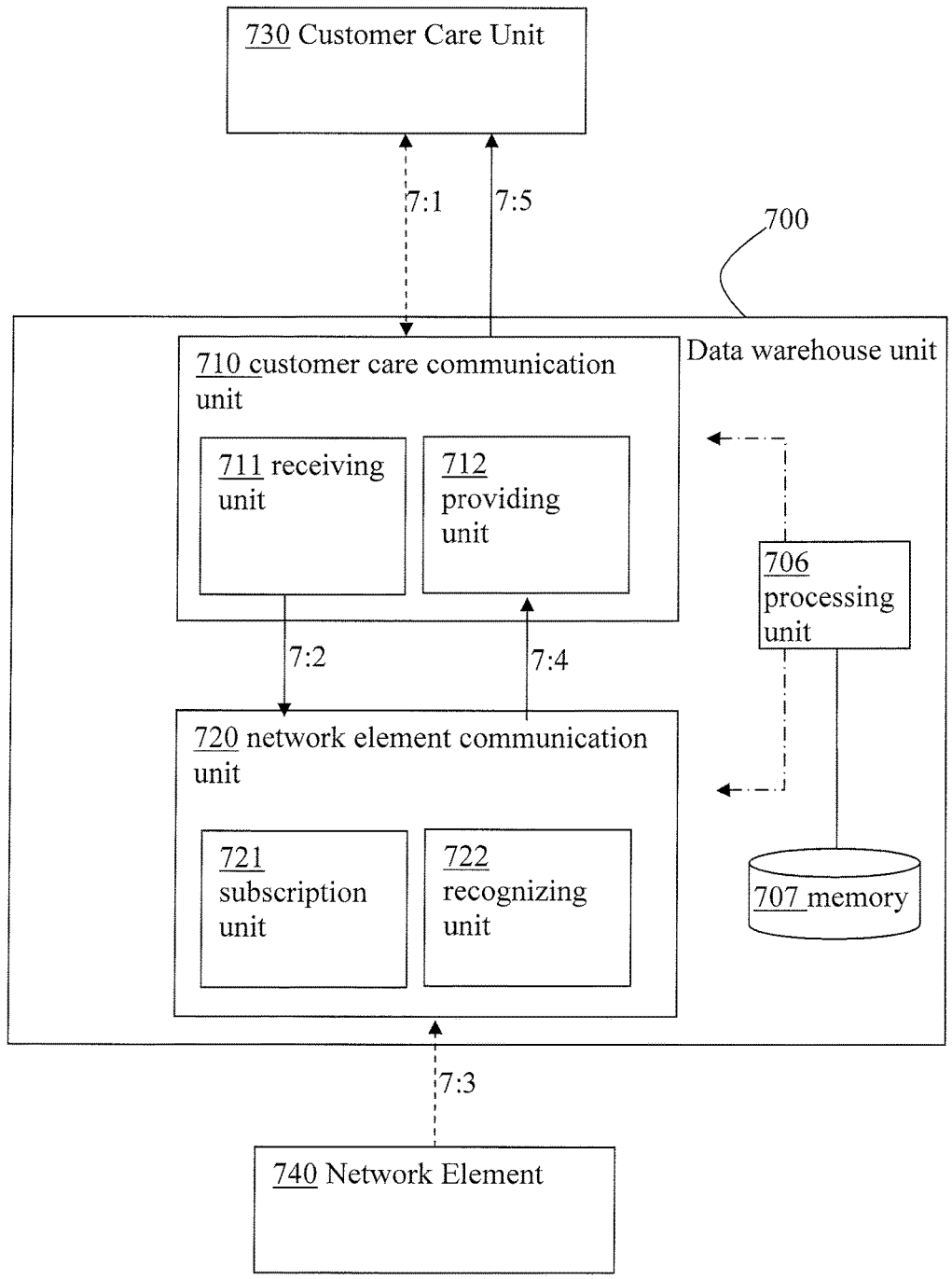
FIG. 7 is a block diagram illustrating an arrangement of a data warehouse unit, according to an exemplifying embodiment.

With reference to FIG. 7, data warehouse 700 adapted to perform the related actions of FIG. 2-FIG. 6, will now be described. The data warehouse 700 is adapted to provide information regarding network events which are associated with a subscriber in an access network. The data warehouse 700 comprises a customer care communication unit 710 adapted to communicate with a customer care unit 730. The customer care communication unit 710 comprises an initiating unit 711, which may be adapted to initiate a customer care session with a customer care unit illustrated by action 7:1. The session may refer to an identity of a subscriber which may be associated with the customer care unit 730. The receiving unit 711 may further be adapted to receive a request to fetch a network history and to subscribe to network events which refer to information on the identity of the subscriber.

The receiving unit 711 may be adapted to instruct a network element communication unit 720 with the subscription request in action 7:2. The request is provided to a subscription unit 721 which may be adapted to subscribe the customer care unit to a stream of ongoing network events. According to one possible embodiment, the subscriber unit 721 registers that the status for the subscriber associated with one or more terminals is set to subscribing mode from idle mode. The network element communication unit 720 further comprises a recognizing unit 722. The recognizing unit 722 may be adapted to recognize ongoing network events which are associated with the identity of the subscriber. The ongoing network events are indicated by action 7:3.

If a network event which is associated with the identity of the subscriber is recognized, then the recognizing unit 722 may further be adapted to provide information regarding a network event to a providing unit 712 in action 7:4. The providing unit 712 may be adapted to provide information in action 7:5 regarding the network events to the customer care unit 730. The information is based on the network events recognized by the recognizing unit 721 and the subscription provided by the subscription unit 722.

The data warehouse 700 may further comprise a processing unit 706 and a memory 707. The processing unit 706 is adapted to pass and process instructions between the units comprised the customer care unit 700. According to one possible embodiment of the data warehouse 700, the customer care communication unit 710 may be adapted to use a diameter protocol to form the communication with the customer care unit 730. The network element communication unit 740 may also be adapted to use a diameter protocol to form the communication to, and reporting from, the network element 740. Although the arrangement in FIG. 7 only discloses one network element 740, it should be understood that the data warehouse 700 may be in communication and receive network events from several network elements.

Figure 8A:
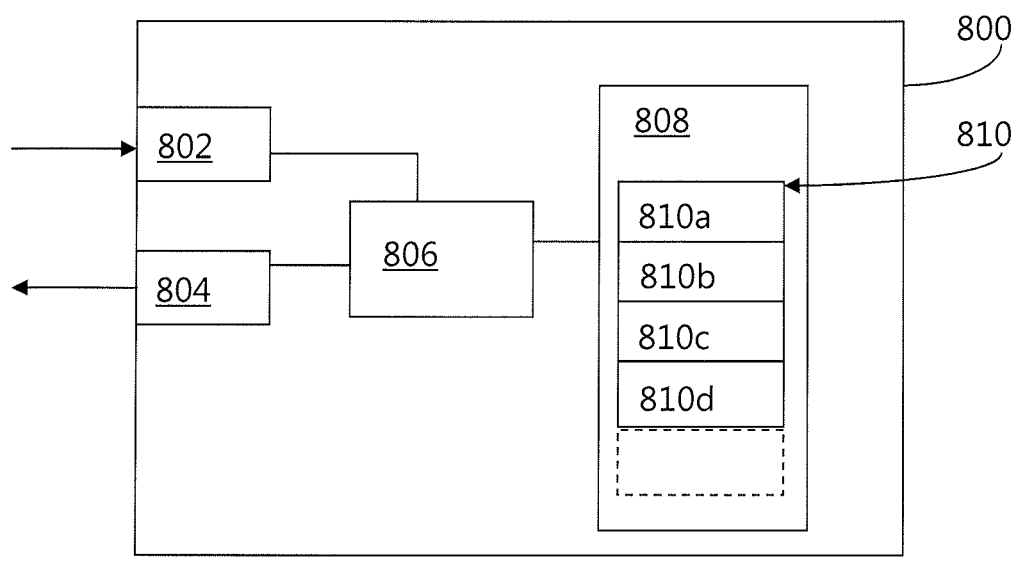
FIG. 8 is a block diagram illustrating an arrangement in a customer care unit, according to an exemplifying embodiment

FIG. 8 schematically shows an embodiment of an arrangement 800 in a customer care unit or in a data warehouse, which also can be an alternative way of disclosing an embodiment of the arrangements for providing information regarding network events which are associated with a subscriber in an access network, which are illustrated in FIGS. 6 and 7. Comprised in the arrangement 800 are here a processing unit 806, e.g. with a DSP (Digital Signal Processor) and a calculation, determination and a deciding module. The processing unit 806 can be a single unit or a plurality of units to perform different actions of procedures described herein. The arrangement 800 may also comprise an input unit 802 for receiving signals and information from other entities, and an output unit 804 for providing signals and information to other entities. The input unit 802 and the output unit 804 may be arranged as an integrated entity.

Furthermore, the arrangement 800 comprises at least one computer program product 808 in the form of a non-volatile memory, e.g. an EEPROM (Electrically Erasable Programmable Read-Only Memory), a flash memory and a disk drive. The computer program product 808 comprises a computer program 810, which comprises code means, which when run in the processing unit 806 in the arrangement 600, 700 causes the arrangement and/or the customer care unit and/or the data warehouse to perform the actions of the procedures described earlier in conjunction with FIG. 2-5b.

The computer program 810 may be configured as a computer program code structured in computer program modules. Hence in the example embodiments described, the code means in the computer program 810 of the arrangement 800 comprises a receiving module 810a for receiving and optionally storing and modifying request for session initiation. The computer program further comprises a requesting module 810b for requesting a subscription at the data warehouse referring to network events associated with the identity of a subscriber. The computer program 810 further comprises a receiving module 810c for receiving ongoing network events from the data warehouse. The computer program also comprises a providing module 810d for providing the information from the data warehouse regarding the network events to a customer care agent. The result may be provided using the output unit 804 to the customer care agent.

The modules 810a-d could essentially perform the actions of the flow illustrated in FIG. 5a, to emulate the arrangement in a customer care unit of FIG. 6. In other words, when the different modules 810a-d are run on the processing unit 706, they correspond to the units 601-605 of FIG. 6.

Similarly, a corresponding alternative to perform the actions of the flow illustrated in FIG. 7 is possible. Thus, the arrangement of FIG. 8 may correspondingly be adapted to perform the actions of the flow illustrated in action 5b, and to emulate the arrangement in a data warehouse of FIG. 7.

Although the code means in the embodiment disclosed above in conjunction with FIG. 8 are implemented as computer program modules which when run on the processing unit causes the arrangement and/or data warehouse and/or the customer care unit to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the data receiving unit.

By using the solution presented above a customer care agent may serve a customer in a more satisfying manner. The customer care agent may continuously have access to the most recent information regarding the customer. A customer management of a telecommunication operator having this function is more likely to keep customers from leaving the operator, thus the churn rate may be decreased.

Another possible advantage with the solution described above is the ability to enable customer care agents to directly support and feedback to the customer. For example, the customer care agent may guide a customer through the process of making an on-line refill, using internet, by giving immediate feedback to the customer regarding the status of the transaction. Getting immediate feedback may lower the barriers for certain customers to use new ways to refill their prepaid services. This example is also applicable in using and subscribing to content services which is enabled and provided by the operator.

While the invention has been described with reference to specific exemplary embodiments, the description is generally only intended to illustrate the inventive concept and should not be taken as limiting the scope of the invention. For example, the terms "network events", "customer care unit", "data warehouse", "subscribe", "network element", "access network" and "terminal", have been used throughout this description, although any other corresponding functions, parameters, nodes and/or units could also be used having the functionalities and characteristics described here. The invention is defined by the appended claims.

Abbreviations

AAA—Authentication, Authorization and Accounting
ACA—Account-Answer
ACR—Account-Request
ASIC—Application Specific Integrated Circuit
AVP—Attribute Value Pair
BSS—Business Support System
CAA—Call & Account Answer
CAI—Call & Account Information
CAR—Call & Account Request
CDR—Call Data Record
CPU—Central Processing Unit
DSP—Digital Signaling Processor
DW—Data Warehouse
EEPROM—Electrically Erasable Programmable Read-Only Memory
IMSI—International Mobile Subscription Identity
IPTV—Internet Protocol TV
MSISDN—Mobile Subscriber Integrated Services Digital Network
NAI—Network Access Identifier
OSS—Operating Support System
RAM—Random Access Memory
RFC—Request For Comment
RMS—Revenue Management System
ROM—Read Only Memory
SIP—Session Initiation Protocol
SOA—Service Oriented Architecture
URI—Uniform Resource Identifier

The invention claimed is:

1. A computer-implemented method in a customer care unit for providing information regarding network events associated with a subscriber in an access network, said computer-implemented method comprising:
    initiating, by a processor of the customer care unit, a customer care data communication session between a data warehouse and an agent communication unit, wherein said customer care data communication session is based on an identity of said subscriber;
    requesting, by the processor, a subscription to the network events associated with said subscriber, wherein said data warehouse subscribes to a stream of ongoing network events of the network events, and wherein content of said stream refers to said identity of said subscriber;
    receiving, by the processor, from said data warehouse, updates comprising information regarding the ongoing network events of said stream which are triggered by one or more communications between a terminal of said subscriber and a network element in said access network;
    providing, by the processor, said received updates comprising the information regarding the ongoing network events to the agent communication unit continuously in real-time, wherein providing said received updates to the agent communication unit continuously in the real-time is performed without continuously polling said data warehouse for fetching the information regarding the ongoing network events, thereby reducing load on the access network and facilitating monitoring and resolution of issues related to the ongoing network events; and
    requesting, by the processor, said data warehouse to unsubscribe from said stream of the ongoing network events when the customer care data communication session has been inactive for a predetermined time period.

2. The method according to claim 1, wherein requesting said subscription comprises fetching network event history, and wherein said network event history comprises network events associated with said identity of said subscriber.

3. The method according to claim 2, further comprising:
    determining whether or not said received information regarding a network event, of the network events, is related to any one of the network events of the network event history.

4. The method according to claim 1, wherein the identity of said subscriber comprises of at least one of: a Subscription-Id-Type Attribute Value Pair (AVP), a Mobile Subscriber Integrated Services Digital Network (MSISDN), an International Mobile Subscriber Identity (IMSI), a Network Access Identifier (NAI), or a Session Initiation Protocol (SIP) Uniform Resource Identifier (URI).

5. The method according to claim 1, wherein the identity of said subscriber is an internet user account.

6. The method according to claim 1, wherein a diameter based protocol is used to form communication between the customer care unit and the data warehouse.

7. A computer-implemented method in a data warehouse for providing information regarding network events associated with a subscriber in an access network, said computer-implemented method comprising:
    receiving, by a processor of the data warehouse from a processor of a customer care unit, a subscription request referring to an identity of said subscriber;
    subscribing, by the processor of the data warehouse, to a stream of ongoing network events of the network events, wherein content of said stream refers to said identity of said subscriber;
    recognizing, by the processor of the data warehouse, an ongoing network event of said stream associated with said subscription which is triggered by one or more communications between a terminal of said subscriber and a network element in said access network;

providing, by the processor of the data warehouse, to the processor of said customer care unit, an update comprising information about said recognized ongoing network event of said stream in real-time, wherein providing the update comprising the information about said recognized ongoing network event continuously in real-time as compared to providing the information by continuously polling the data warehouse for fetching the information about said recognized ongoing network event, reduces load on the access network and facilitates monitoring and resolution of issues related to said recognized ongoing network event, and wherein the network events comprise a network event that is produced when an account of said subscriber is modified, and receiving, from the processor of said customer care unit, a request for unsubscribing the processor of said customer care unit to said stream of said ongoing network events of the network events when a customer care data communication session, between said customer care unit and a network element communication unit, has been inactive for a predetermined time period.

8. The method according to claim 7, further comprising receiving a request for fetching a network event history comprising network events associated with said identity of said subscriber.

9. The method according to claim 7, wherein the identity of said subscriber comprises of at least one of: a Subscription-Id-Type Attribute Value Pair (AVP), a Mobile Subscriber Integrated Services Digital Network (MSISDN), an International Mobile Subscriber Identity (IMSI), a Network Access Identifier (NAI), or a Session Initiation Protocol (SIP) Uniform Resource Identifier (URI).

10. The method according to claim 7, wherein the identity of said subscriber is an internet user account.

11. The method according to claim 7, wherein a diameter based protocol is used to form communication between the processor of said customer care unit and the data warehouse.

12. The method according to claim 7, wherein the network element provides said ongoing network event of said stream to said data warehouse using a Call Data Record (CDR) and/or a diameter based protocol.

13. A system comprising a customer care unit configured to provide information regarding network events which are associated with a subscriber in an access network, said customer care unit comprising a processor and memory, the memory comprising computer executable instructions, the computer executable instructions when executed by the processor, cause the processor to:

receive a request to initiate a customer care data communication session between a data warehouse and an agent communication unit, wherein said customer care data communication session is based on an identity of said subscriber;

request a subscription to the network events associated with said subscriber from said data warehouse, wherein said data warehouse subscribes to a stream of ongoing network events of the network events;

receive, from said data warehouse, updates comprising information regarding the ongoing network events of said stream which are triggered by one or more communications between a terminal of said subscriber and a network element in said access network;

provide said received updates comprising the information regarding the ongoing network events to the agent communication unit continuously in real-time, wherein the provision of said received updates to the agent communication unit continuously in the real-time is performed without continuously polling the data warehouse for fetching the information regarding the ongoing network events, which thereby reduces load on the access network and facilitates monitoring and resolution of issues related to the ongoing network events; and request said data warehouse to unsubscribe from said stream of the ongoing network events of the network events when the customer care data communication session has been inactive for a predetermined time period.

14. The system according to claim 13, wherein the processor is further configured to fetch a network event history comprising network events associated with said identity of said subscriber.

15. The system according to claim 14, wherein the processor is further configured to determine whether or not said received information regarding a network event, of the network events, is related to any one of the network events of the network event history.

16. The system according to claim 13, wherein the identity of said subscriber comprises of at least one of: a Subscription-Id-Type Attribute Value Pair (AVP), a Mobile Subscriber Integrated Services Digital Network (MSISDN), an International Mobile Subscriber Identity (IMSI), a Network Access Identifier (NAI), or a Session Initiation Protocol (SIP) Uniform Resource Identifier (URI).

17. The system according to claim 13, wherein the identity of said subscriber is an internet user account.

18. The system according to claim 13, wherein the processor is further configured to use a diameter based protocol to form communication between the customer care unit and the data warehouse.

19. A system comprising a data warehouse configured to provide information regarding network events which are associated with a subscriber in an access network, said data warehouse comprising a processor and memory, the memory comprising computer executable instructions, the computer executable instructions when executed by the processor, cause the processor to:

initiate a customer care data communication session between a customer care unit associated with another processor and a network element communication unit, wherein said customer care data communication session is based on an identity of said subscriber;

subscribe said customer care unit associated with the another processor, to a stream of ongoing network events of said network events, wherein said network events are associated with said identity of said subscriber;

recognize said ongoing network events of said stream which are associated with said identity of said subscriber;

provide updates comprising information regarding said recognized ongoing network events of said stream to said customer care unit associated with the another processor, wherein said processor is configured to provide the updates comprising the information regarding said recognized ongoing network events of said stream to said customer care unit, associated with the another processor, continuously in real-time, based on said ongoing network events of said stream recognized by said processor and said subscription provided by said processor, wherein provision of the updates comprising the information regarding said recognized ongoing network events continuously in the real-time is performed without continuously polling the data warehouse for fetching the information regarding said ongoing network events, which thereby reduces load on the access network and facilitates monitoring and resolution of issues related to said ongoing network events, and wherein the network events comprise a network event that is produced when an account of said subscriber is modified; and receive, from the another processor associated with said customer care unit, a request to unsubscribe said customer care unit to said stream of said ongoing network events of the network events when the customer care data communication session has been inactive for a predetermined time period.

20. The system according to claim 19, wherein the processor is further configured to provide a network event history comprising network events associated with said identity of said subscriber to said customer care unit.

21. The system according to claim 19, wherein the identity of said subscriber comprises of at least one of: a Subscription-Id-Type Attribute Value Pair (AVP), a Mobile Subscriber Integrated Services Digital Network (MSISDN), an International Mobile Subscriber Identity (IMSI), a Network Access Identifier (NAI), or a Session Initiation Protocol (SIP) Uniform Resource Identifier (URI).

22. The system according to claim 19, wherein the identity of said subscriber is an internet user account.

23. The system according to claim 19, wherein said processor is further configured to communicate with the customer care unit using a diameter based protocol.

24. The system according to claim 19, wherein said processor is further configured to receive said ongoing network events of said stream by using one or more Call Data Records (CDRs) and/or by using a diameter based protocol.

25. A system for providing information regarding network events which are associated with a subscriber in an access network, said system comprising:

a data warehouse comprising a processor configured to receive and store the information referring to said network events;

a network element configured to send information referring to one or more network events of said network events to said data warehouse, said one or more network events of said network events being triggered by one or more communications between a terminal of said subscriber and said network element; and a customer care unit comprising another processor configured to initiate a customer care data communication session between said data warehouse and an agent communication unit based on an identity of said subscriber, wherein said customer care unit is further configured to request, from said data warehouse, a subscription to a stream of ongoing network events of the network events associated with said subscriber, wherein said data warehouse is configured to subscribe to the stream of the ongoing network events of the network events based on the request from said customer care unit, wherein content of said stream refers to said identity of said subscriber, wherein said data warehouse is further configured to provide updated information to said customer care unit, based on said ongoing network events of said stream continuously in real-time, wherein the provision of the updated information regarding said ongoing network events continuously in the real-time is performed without continuously polling said data warehouse for fetching the information regarding said ongoing network events, which thereby reduces load on the access network and facilitates monitoring and resolution of issues related to said ongoing network events, and wherein the network events comprise a network event that is produced when an account of said subscriber is modified, and wherein said data warehouse is further configured to receive, from the another processor of said customer care unit, a request of unsubscribing the another processor of said customer care unit to said stream of said ongoing network events of the network events when the customer care data communication session has been inactive for a predetermined time period.

* * * * *